(12) United States Patent
Hwang et al.

(10) Patent No.: US 7,930,274 B2
(45) Date of Patent: Apr. 19, 2011

(54) DUAL ACCESS TO CONCURRENT DATA IN A DATABASE MANAGEMENT SYSTEM

(75) Inventors: Sang Yong Hwang, Seoul (KR); Ki Hong Kim, Seoul (KR); Sung Heun Wi, Seoul (KR); Sang Kyun Cha, Seoul (KR)

(73) Assignee: SAP AG, Walldorf (DE)

( * ) Notice: Subject to any disclaimer, the term of this patent is extended or adjusted under 35 U.S.C. 154(b) by 808 days.

(21) Appl. No.: 11/854,140

(22) Filed: Sep. 12, 2007

(65) Prior Publication Data

US 2009/0070330 A1  Mar. 12, 2009

(51) Int. Cl.
*G06F 7/00* (2006.01)
(52) U.S. Cl. .......................... 707/648; 707/649; 707/703
(58) Field of Classification Search .................. 707/648, 707/649, 703
See application file for complete search history.

(56) References Cited

U.S. PATENT DOCUMENTS

| | | | | |
|---|---|---|---|---|
| 5,870,758 | A * | 2/1999 | Bamford et al. | 1/1 |
| 7,653,665 | B1 * | 1/2010 | Stefani et al. | 709/203 |
| 2006/0036655 | A1 * | 2/2006 | Lastovica | 707/203 |

* cited by examiner

*Primary Examiner* — Etienne P LeRoux
*Assistant Examiner* — Cindy Nguyen
(74) *Attorney, Agent, or Firm* — Schwegman, Lundberg & Woessner, P.A.

(57) ABSTRACT

Various embodiments include one or more of systems, methods, software, and data structures that allow dual access to concurrent data in a database management system including uncommitted updated data. Some embodiments include a dual snapshot of data in a multi-version concurrency control style database, but the embodiments described herein are equally applicable to virtually any other type of database and database management system.

22 Claims, 8 Drawing Sheets

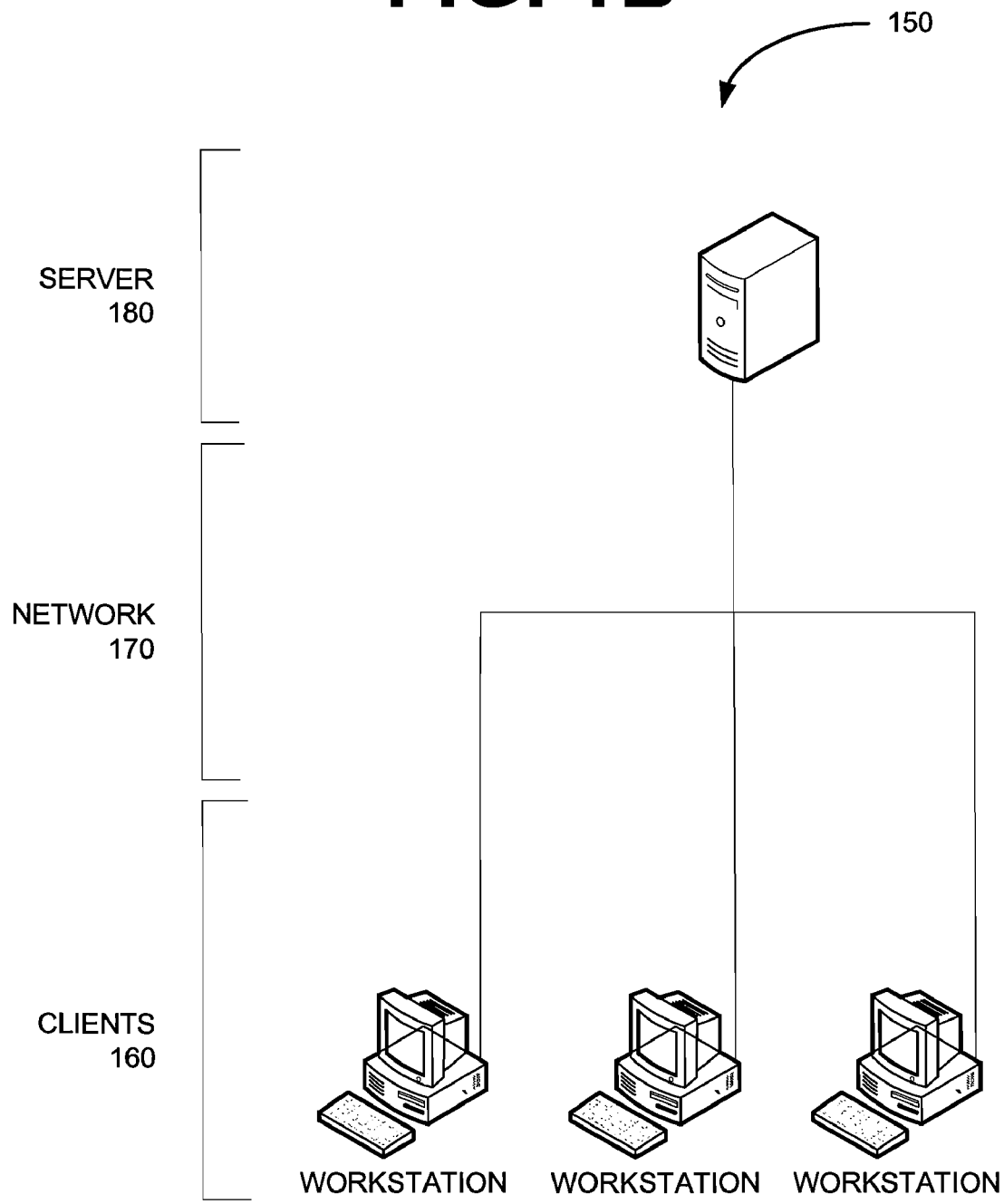

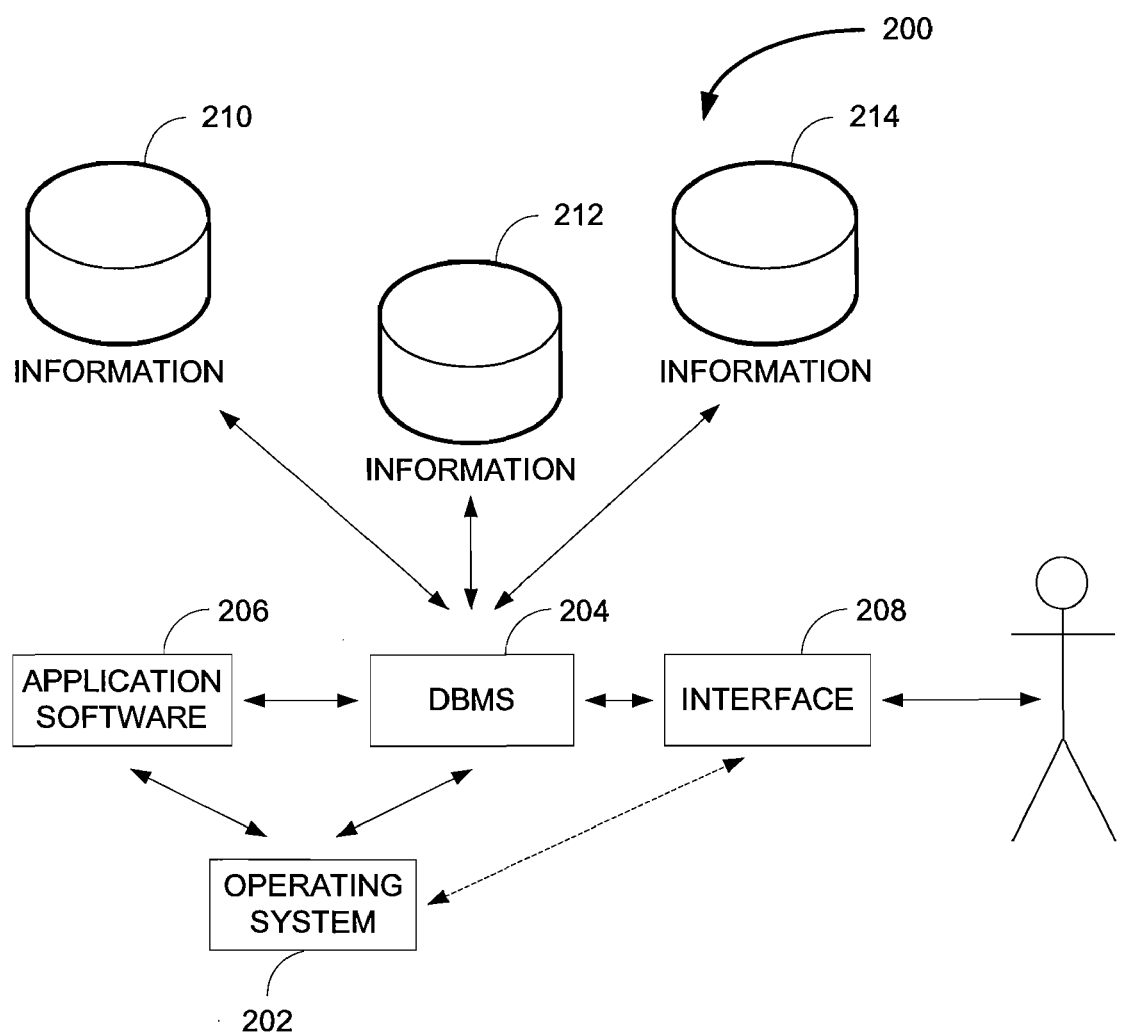

FIG. 3
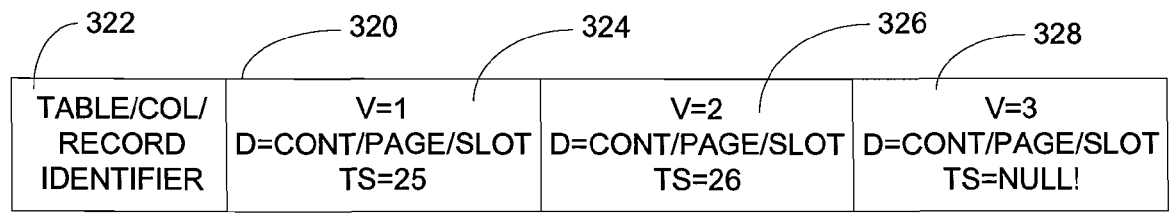
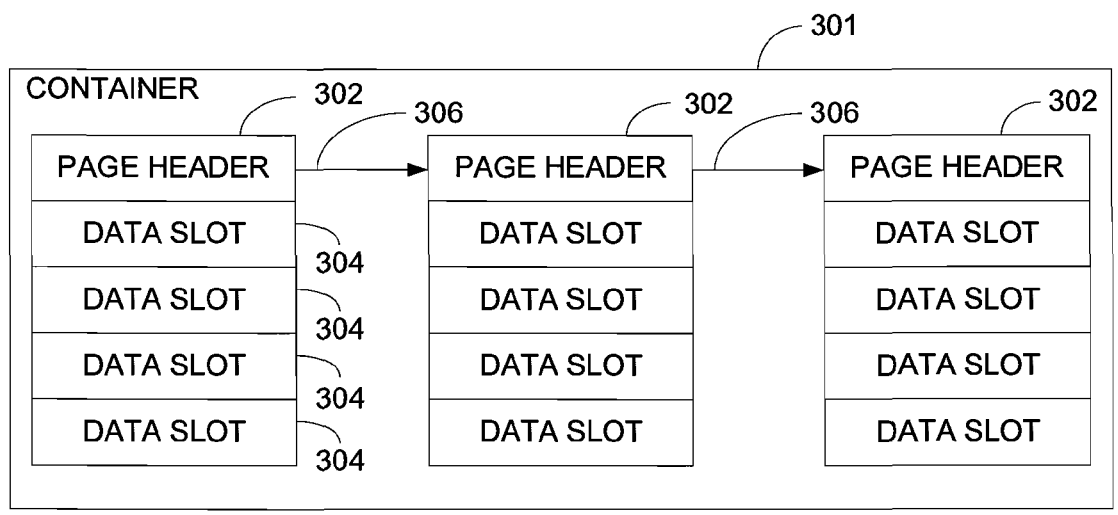

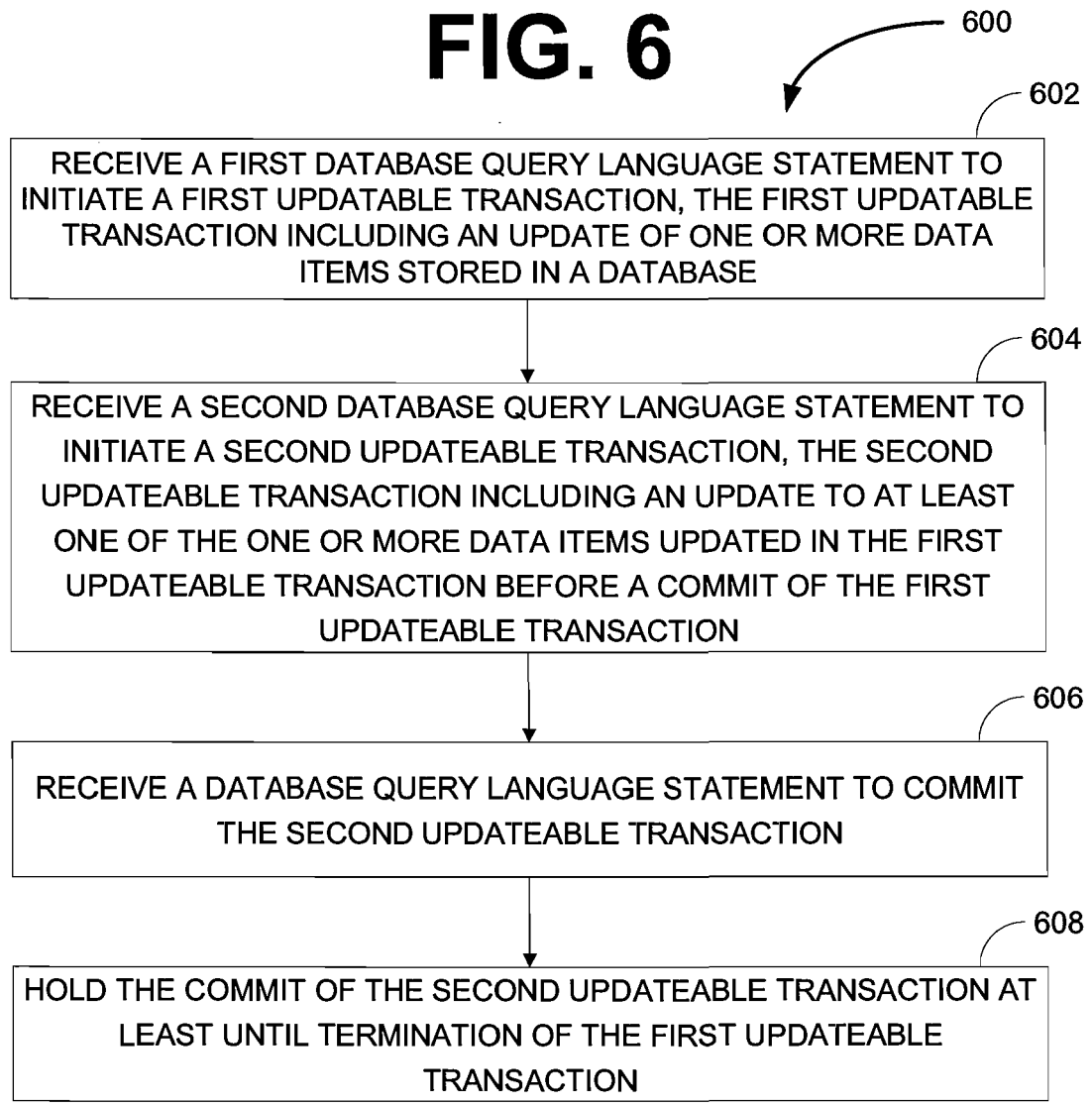

702 — MAINTAIN A READER SNAPSHOT OF DATA STORED IN A DATABASE AND A WRITER SNAPSHOT OF DATA STORED IN THE DATABASE, THE WRITER SNAPSHOT OF DATA INCLUDING UNCOMMITTED, MODIFIED VALUES OF TRANSACTIONS AND THE READER SNAPSHOT INCLUDING UNMODIFIED COMMITTED DATA VALUES

704 — RECEIVE A FIRST QUERY LANGUAGE STATEMENT TO INITIATE A FIRST TRANSACTION TO UPDATE DATA

706 — RETRIEVE DATA FROM THE WRITER SNAPSHOT OF DATA TO FULFILL THE FIRST QUERY LANGUAGE STATEMENT, THE RETRIEVED DATA OF THE WRITER SNAPSHOT OF DATA INCLUDING AN UNCOMMITTED DATA VALUE UPDATED IN ANOTHER TRANSACTION

708 — RECEIVE A SECOND QUERY LANGUAGE STATEMENT TO UPDATE THE UNCOMMITTED DATA VALUE UPDATED IN THE ANOTHER TRANSACTION

710 — RECEIVE A THIRD QUERY LANGUAGE STATEMENT TO COMMIT THE UPDATE OF THE SECOND QUERY LANGUAGE STATEMENT

712 — HOLD THE COMMIT OF THE THIRD QUERY LANGUAGE STATEMENT UNTIL A COMMIT IS PERFORMED WITHIN THE ANOTHER TRANSACTION

714 — UPDATE THE READER SNAPSHOT OF DATA WITH MOST RECENTLY UPDATED DATA VALUES UPON COMMITTING A TRANSACTION

DUAL ACCESS TO CONCURRENT DATA IN A DATABASE MANAGEMENT SYSTEM

BACKGROUND INFORMATION

Stored data under management of a database management system typically may be read in two ways. The first way of reading data is read-only which is commonly utilized by users, human and logical, for reporting purposes. No exclusive locks on data are created when data is read in a read-only fashion. The other way of reading data is read-for-update. When a read-for-update is performed, an exclusive lock is placed on at least the affected data, if not the entire rows or pages of data from which the data is selected. In such read-for-update instances, other users may not access the exclusively locked data until a transaction of the read-for-update is terminated, such as through a commit or rollback. Exclusive locking of data prevents not only other read-for-update transactions, but also read-only transactions.

As a result of data and row locking caused by read-for-update transactions, database latency may become an issue. Although systems accessing data in a database management system may be able to perform operations on data quickly, the database may not be able to keep pace in providing needed data when the data is locked. Thus, database latency is often a root cause of overall system latency.

Multi-version concurrency control (MVCC) provides a solution. MVCC systems maintain multiple versions of a record in a database management system and provide concurrent access to the database. Each user is provided with a "snapshot" of the database. Any changes made within that snapshot are not seen by other users of the database until the transaction has been committed.

MVCC uses time stamping, incremental transaction IDs, or other similar solutions to ensure a transaction does not need to wait for a locked record or other database objects by maintaining several versions of the record. Each version is given a relational identifier, such as a timestamp, to track relations between the concurrent data snapshots. A transaction is allowed to read the most recent committed version of a record that precedes its relational identifier.

Each time a record is edited and the change is posted to the database, the database management system creates a new version of the record. All other transactions operating with the record continue see the old version as long as they do not commit. Accordingly, a user accessing a given record sees the most recently committed version of the record. However, the user cannot access a newer version of the record as modified in an open, uncommitted read-for-update transaction. Such newer record versions are enclosed and isolated within their respective transactions until committed.

SUMMARY

Various embodiments include one or more of systems, methods, software, and data structures that allow dual access to data concurrently accessed by two or more users in a database management system including uncommitted updated data. Some embodiments include a dual snapshot of data in a multi-version concurrency control style database, but the embodiments described herein are equally applicable to virtually any other type of database and database management system.

BRIEF DESCRIPTION OF THE DRAWINGS

FIG. 1B is a block diagram of a system according to an example embodiment.

FIG. 2 is a block diagram of a system according to an example embodiment.

FIG. 3 is a diagram of data structures according to an example embodiment.

FIG. 6 is a block flow diagram of a method according to an example embodiment.

FIG. 7 is a block flow diagram of a method according to an example embodiment.

DETAILED DESCRIPTION

Various embodiments include one or more of systems, methods, software, and data structures that allow dual access to data concurrently accessed by two or more users in a database management system including uncommitted updated data. Some embodiments include a dual snapshot of data in a multi-version concurrency control style database, but the embodiments described herein are equally applicable to virtually any other type of database and database management system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1A:
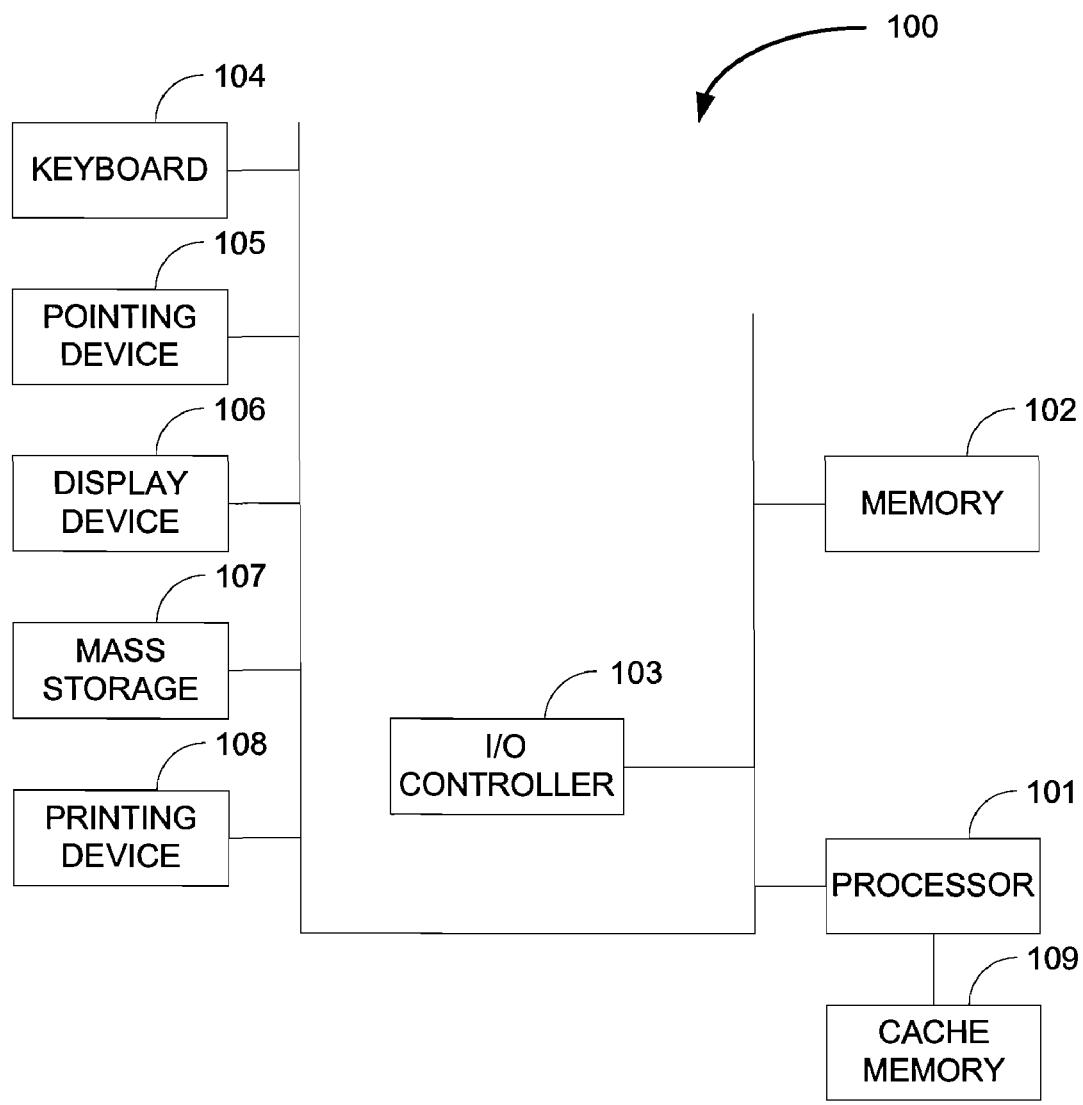
FIG. 1A is a block diagram of a system according to an example embodiment.

FIG. 1A is a block diagram of a system 100 according to an example embodiment. FIG. 1A illustrates a computer system 100 that may be included in some embodiments. The system 100 includes a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes, or is coupled to, a cache memory 109 for storing frequently accessed information. That is, cache memory 109 may be an on-chip cache or external cache (as shown). Additional input/output devices, such as a printing device 108, may be included in the system 100, as desired. As shown, the various components of the system 100 communicate through a system bus 110, a switching fabric, or similar architecture.

FIG. 1B is a block diagram of a system 150 according to an example embodiment. FIG. 1B illustrates a client-server system 150 of some embodiments. However, other embodiments may be implemented in a single (standalone) computer as well. System 150 includes a first computer or server 180 and one or more second computers or clients 160. In an exemplary embodiment, the clients or workstations 160 are connected to server 180 through a computer network 170, which may be a conventional Local Area Network (LAN). Network 170 may include the Internet, wide area network (WAN), or the like. The workstations themselves may be similar to or the same as system 100. Server 180 may also be similar to or the same as system 100, but may include one or more of a relatively faster processor, larger mass storage, and more system memory than each workstation.

FIG. 2 is a block diagram of a system according to an example embodiment. FIG. 2 illustrates a computer software system 200 that is provided in some embodiments for programming the operation of the computer system 100 according to one embodiment. Software system 200, which is stored in one or more of system memory 102 and disk memory 107, includes a kernel or operating system 202 and a DBMS 204. Operation system (OS) 202 is the executive or supervisor for the system 100, directing both task management and data management.

One or more application programs 206, such as application software, may be "loaded" (i.e., transferred from storage 107 into memory 102) for execution by the system 100. DBMS 204 is also loaded into memory 102. A user interface 208, such as a Graphical User Interface ("GUI"), Application Programming Interface ("API"), or other interface, may be used to receive user commands and data. The user interface 208 may also serve to display or return the results of operation from the OS 202 and application 206, whereupon the user, human or logical, may supply additional inputs or terminate the session. User interface 208 may be part of the DBMS 204.

The DBMS 204 generally is a software subsystem for storing, retrieving, and manipulating information 210, 212, and 214, stored in database tables. Information 210, 212, and 214 may be records, data pages, data containers, or other structures. Under the command of DBMS 204, the system 100 receives user commands and data through user interface 208. User interface 208 may include a built-in query surface or editor for accessing and processing database information. In some embodiments, the database tables including information 210, 212, and 214 may be loaded in memory 102 to provide a memory centric database system. Such systems provide much faster data processing capabilities than he conventional disk-based database system since the data does not need to move back and forth between the memory and disk storage devices.

FIG. 3 is a diagram of data structures according to an example embodiment. The data structures include logical database tables 310, version tables 320, and containers 301.

The illustrated logical database table 310 is a logical representation of how data is stored in a column and row fashion in a database, such as a database under control of the database management system 204 of FIG. 2. Such tables typically include one or more columns that make up a key to uniquely identify rows so that data of one database table 310 may be related to another database table. When a user accesses a database table 310, key values of one or more tables may be used to identify data to retrieve, update, delete, or other actions.

The data of a logical database table 310 may be stored in a storage or memory device in the form of the database table 310. However, in some embodiments, the data may be stored in data slots 304 of data pages 302 of data containers 301 which equate to physical storage locations in memory or storage. A logical database table 310 may then be linked to the physical storage using a version table 320.

A version table 320 may be a hash table or a permanent table that may be utilized for data warehousing, maintaining a data audit trail, and other purposes. The version table typically includes an association 322 to a database table 310 column and row. Multiple versions of data of the table/column/row value may be stored in the version table 320. For example, a number of version slots 324, 326, 328 may exist in a version table 320. In some embodiments, the number of version slots may be fixed, but the number of version slots in other embodiments may only be limited by the amount of memory or storage resources available to a system, such as the database management system 204 of FIG. 2. In some embodiments, a version table 320 may exist for each table/column/row/column of each database table 310. In other embodiments, a version table may exist for each row, which may also be referred to as a record, of a database table 310. The granularity at which the version tables exists may also vary between embodiments, from table to table, and may be set, in some embodiments, as a default setting or by an administrator.

In some embodiment, the version slots 324, 326, 328 each include a version number (i.e., V=1, V=2, V=3, etc.) and a memory address or other mapping to a location where a value of the version is stored. As illustrated, the mapping is represented as "D=CONT/PAGE/SLOT." This mapping refers to a data slot 304 of a page 302 within a container 301. The value of a version identified in the version table 320 is stored in the mapped location. The mapping in some embodiments may include a physical memory address or other address that may or may not need to be translated to a physical address.

A data container 301 may include one or more data pages 302 that are used to store data according to an example embodiment. Each data page 302 may be linked to other pages by pointers 306 to establish a relationship between pages 302. A data page 302 is typically memory or storage block and includes one or more data slots 304. A data slot 304 is a sub-block in the data page 302 and stored an image, such as a value, of the data of a version. In some embodiments, each data slot has an address that may be used as a record identifier ("RID"). This RID may be used in a version table 320 version slot 324, 326, 328.

Embodiments including version tables 320 allow multiple values to be mapped to a single database table row and column or database record. In some embodiments, multiple versions of values of a database table may be utilized to maintain multiple snapshots of data for use in servicing transactions accessing data stored in a database.

In some embodiments, when a read-only transaction is initiated within the database management system, a snapshot of data needed by the transaction is retrieved and placed into a read-only snapshot for that transaction. In other embodiments, a read-only instance of logical database tables 310 is maintained in memory or storage and data may be read from the read-only instance by all read-only transactions. When an update is committed to an updatable instance or a stored value of data, a new read-only instance is created that will be used by subsequently initiated read-only transactions.

Another snapshot may be taken of the data to allow updates. An updatable transaction, such as a transaction including a "READ FOR UPDATE" query language statement, may take a snapshot of currently stored values of data needed by the transaction. In some embodiments including version tables 320, a most recent version of the data values are retrieved from data slots as identified within the mappings of the version tables 320. However, in some embodiments, when another transaction has modified a data value, the updatable transaction, rather than being locked from accessing a data item that is in a modified but uncommitted state, the transaction may access the new, uncommitted value and perform further modifications. The current transaction is typically prevented from committing the transaction until the other transaction is committed, but time-consuming locks are avoided. In some embodiments, in the event the other transaction rolls back the modified value(s), the current transaction may also be forced to rollback, but such instances are likely to be rare in most embodiments. In some embodiments, uncommitted modified values of a first transaction may only be read by other updatable transactions if the first transaction has issued a commit statement that has not yet been executed. As a result, in such embodiments, if the commit is not successful, other transactions modifying the same values need not be rolled back because the intention of the first transaction to commit is known. Thus, rolling back of subsequent modifications is not required in such embodiments.

In such embodiments, a modified, uncommitted version is identified as the most recent version, such as a highest version number, with a timestamp of when the version was committed of NULL as is illustrated in version slot 328 "TS=NULL!" In some embodiments, read-only transactions may also access such uncommitted modified data values. In some embodiments, the data available to read-only transactions is set by a system administrator. However, in some embodiments, a user may specify within a read-only transaction whether to read uncommitted modified values.

Thus, depending on the embodiment, there may two or more snapshots of data stored in a database. In a simplified form, there may be global snapshots available to all transactions. The global snapshots may include a read-only snapshot that is always accessible for reading. After data modifications have been committed in updatable transactions, a new global read-only snapshot is created for use by subsequent read-only transactions. Current global snapshots, in some embodiments, may also include an updatable snapshot that may be modified by transaction and always include the most recent changes, even if the changes are not yet committed.

The snapshots, in some embodiments, include one or both of a read-only snapshot and an updatable snapshot for each transaction. These snapshots may be instantiated in memory and maintained for the life of a transaction. When data is needed only for reads, the read-only snapshot is used. However, once any modification is made to the data, the updatable snapshot is used. In embodiments where version tables 320 and data slots 304 are utilized, the modified value may be inserted into a data slot 304 and a version slot is added or overwritten within a version table 320. The new version is then available to other updatable snapshots and transactions and may be further modified.

Figure 4:
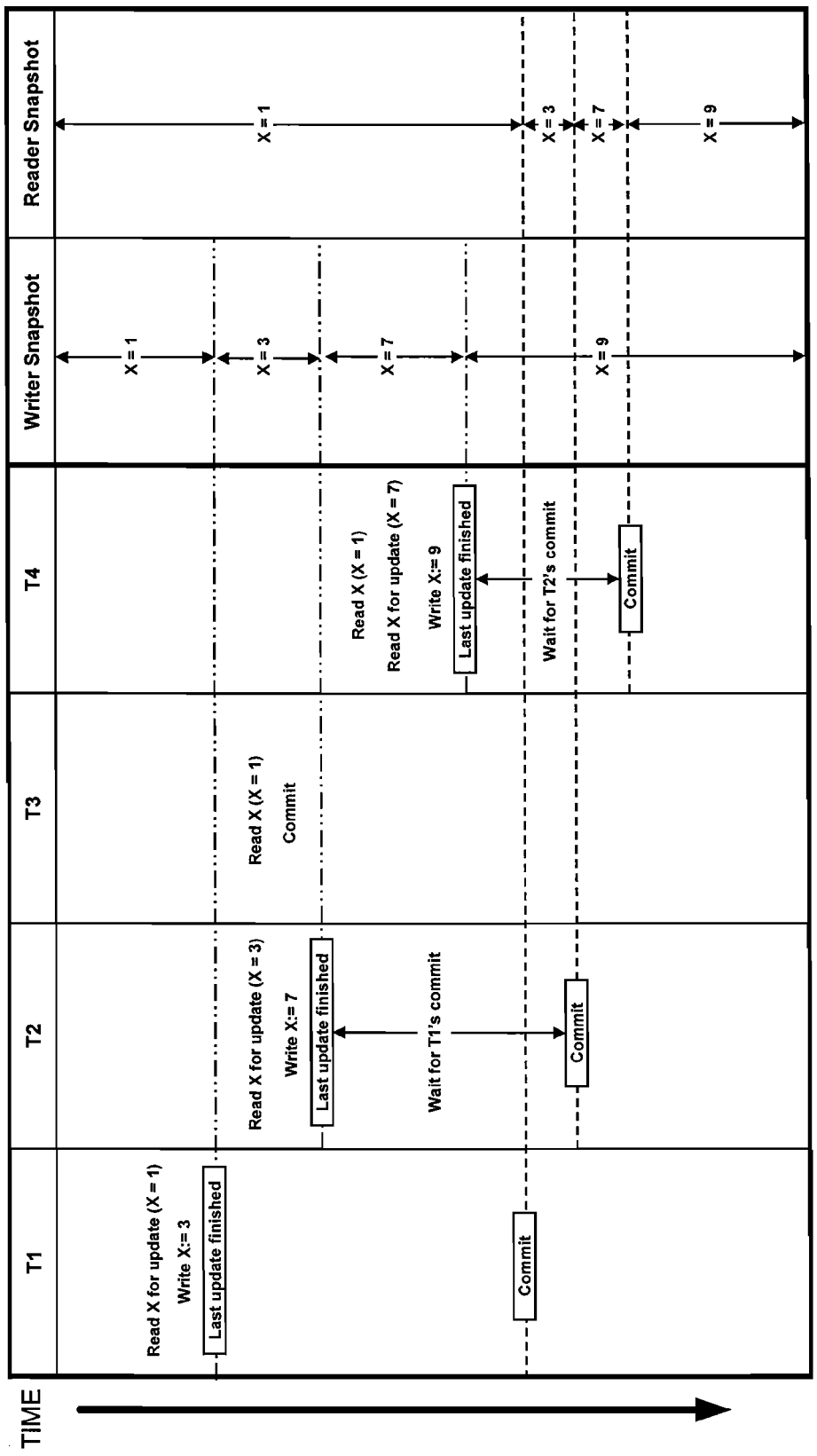
FIG. 4 illustrates data interaction with multiple data snapshots according to an example embodiment.

FIG. 4 illustrates data interaction with multiple data snapshots according to an example embodiment. FIG. 4 includes four transactions: T1, T2, T3, and T4. FIG. 4 also includes two snapshots of data: Writer Snapshot and Reader Snapshot. The snapshots may be global snapshots or snapshots of the individual transactions T1, T2, T3, and T4. The transaction numbers 1, 2, 3, and 4 indicate the sequence of which the transactions are initiated; T1 first, T2 second, and so forth. The timing of actions performed within the transactions in relation to each other are illustrated in a descending fashion from top to bottom.

Transaction T1 is initiated first and reads data item X for update where X=1. In the Writer Snapshot X=1 and in the Reader Snapshot X=1. Transaction T1 updates X by writing X=3. The Writer Snapshot is updated so X now equals three. However, Transaction T1 has not yet been committed, so in the Reader Snapshot X still equals one.

Transactions T2 and T3 are then initialized. Transactions T2 and T3 may access both snapshots. The snapshot value for X in the Reader Snapshot is still X=1 and for the Writer Snapshot is X=3. X=3 is the value the uncommitted, modified value as set by transaction T1. Transaction includes another update to X and writes X=7. Transaction T3 is a read-only transaction and utilizes the Reader Snapshot value for X of X=1 which is the most recently committed version of X. In some embodiments, the X=7 Writer Snapshot as set by transaction T2 cannot be committed until the X=3 value of transaction T1 is committed. Thus, there is a commit dependency between T2 and T1. This commit dependency is discussed in detail below with regard to FIG. 5.

Transaction T4 is then initialized. Transaction T4 accesses the snapshots or instantiates its own snapshots. The Writer Snapshot of T4 includes X=7 and the Reader Snapshot of T4 includes X=1. Transaction T4 then writes X=9 to the Writer Snapshot and finishes. Transaction T4 is then dependent on the committal of the X values of transaction T1 and T2. Transaction T1 commits first which then allows transaction T2 to commit. Once transaction T1 commits, the Reader Snapshot is updated to include the value for X of X=3. Then transaction T2 commits and the Reader Snapshot is updated to include the value for X of X=7. In some embodiments, updating the Reader Snapshot includes creating a new Reader Snapshot. In such embodiments, other read-only transactions accessing the original Reader Snapshot continue with the original Reader Snapshot. However, subsequently initiated read-only transactions access the new Reader Snapshot. Transaction T4 is then free to commit and the new Reader Snapshot and Writer Snapshot both include the value for X of X=9.

In some embodiments, if any of the transactions after updating the value of X are rolled back, all transactions that subsequently modify X are also rolled back. Thus, pending transactions, waiting on one or more commit dependencies to be resolved, may be forced to rollback. In other embodiments, if a transaction updating the value of X has not yet issued a commit, other transaction may not access the updated value of X. However, once a commit statement has been issued, even if the commit has not yet been performed, other transactions may access the modified value of X. In such embodiments, if the commit is unsuccessful, other transactions accessing and utilizing the modified value of X are not affected. The other transactions may continue without regard to the failed commit because the intent of the modification is known. Further detail of commit dependencies are described below with regard to FIG. 5.

Figure 5:
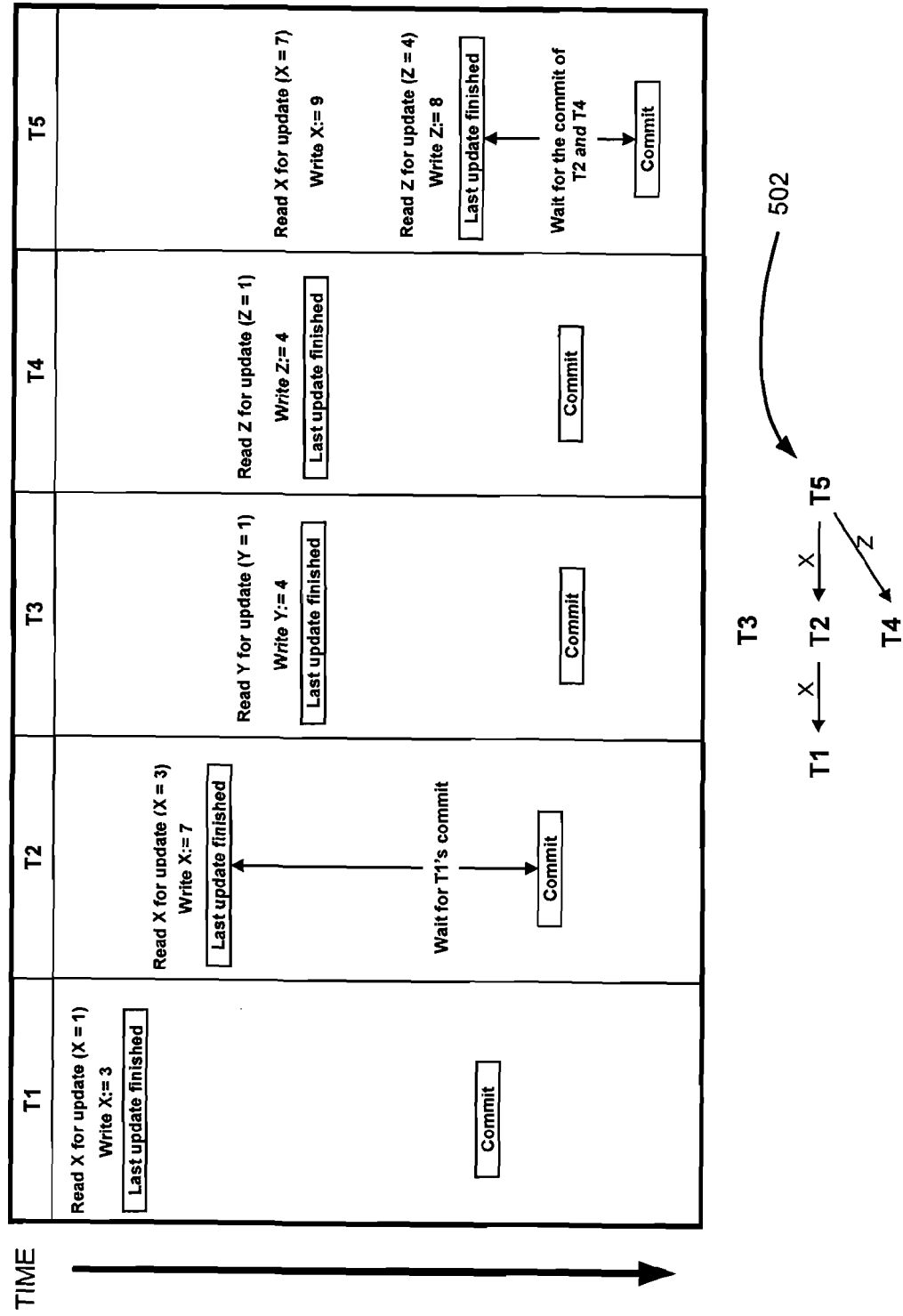
FIG. 5 illustrates data update dependencies according to an example embodiment.

FIG. 5 illustrates data update dependencies according to an example embodiment. FIG. 5 illustrates a group of five transactions, T1, T2, T3, T4 and T5, in a similar manner as FIG. 4. However, FIG. 5 illustrates commit dependencies between the transactions. Time is reflected in the table of FIG. 5 in a descending manner from the top of the table to the bottom. Under the table is a commit dependency branch 502 showing how commits of the transactions T1, T2, T3, T4, and T5 are dependent upon each other. Each of the transactions T1, T2, T3, T4, and T5 are updatable transactions, and thus, the writer snapshot is modified in each.

Transaction T1 first performs a read for update of X=1 and modifies X to where X=3. Transaction T2 then performs a read for update of X=3 and writes X=7. Because T1 has not committed X=3 yet, the update of transaction T2 to X is dependent upon a commit of T1. This dependency is illustrated in the commit dependency branch 502 below the table. T2 includes an arrow for X pointing to T1 to indicate the dependency.

Transaction T3 then performs a read for update of Y=1 and Writes Y=4. Transaction T3 does not modify any value for which an update is pending. Thus, transaction T3 is included in the commit dependency branch 502 without any dependencies. Similarly, transaction T4 performs a read for update of Z=1 and writes Z=4. Transaction T4 does not modify a value for which an update is pending. Thus, as with T3, T4 is included in the commit dependency branch 502 without any dependencies. Both transactions T3 and T4 may commit their respective updated values of Y=4 and Z=4 at any time.

Transaction T5 performs a read of X for update of X=7 and a write of X=9. Transaction T5 further performs a read for update of Z=4 and writes Z=8. Transaction T5 must wait for transaction T2 to commit its value of X=7 and T4 to commit its value of Z=4 before it, transaction T5, is allowed to commit its updates. The dependency of transaction T5 on both transactions T2 and T4 is illustrated in the commit dependency branch 502 by the arrow from T5 for X to T2 and the arrow from T5 for Z to T4.

The commit dependency branch 502 illustrates the dependencies described above. Transaction T1 must commit its modified value X before transaction T2 is allowed to commit its value for X. Further T5 is prevented from committing its value for X until transaction T2 commits. Transactions T3 and T4 are free to commit at any time as they have no dependencies. However, transaction T5 must wait for both transactions T2 and T4 to commit. Other transactions may be dependent on more than two transactions.

In the event of a rollback of a transaction, some embodiments may require rolling back pending updates of dependent transactions. For example, if transaction T2 is rolled back rather than committed, Transaction T5 must be rolled back as well. In some embodiments, in the event of a rollback, a writer snapshot may be overwritten with or copied from the reader snapshot. In other embodiments however, a modified value of a first transaction may only be accessed by other transactions upon receipt of an intent to commit a modified value from the first transaction, such as through issuance of a commit by the first transaction. An intent to commit in such embodiments may provide other transactions one or both of the abilities to read and update the modified value. An intent to commit may remove the necessity to rollback subsequent modifications to one or more values also modified in the first transaction because the intent of the first transaction is known. Rolling back the other transactions is assumed, in some embodiments, to be unnecessary.

FIG. 6 is a block flow diagram of a method 600 according to an example embodiment. The method 600 is an example embodiment of uncommitted data updates of one database transaction being accessible to other transactions subsequently accessing the updated data. The example method 600 includes receiving a first database query language statement to initiate a first updatable transaction, the first updatable transaction including an update of one or more data items stored in a database 602. The method 600 further includes receiving a second database query language statement to initiate a second updatable transaction, the second updatable transaction including an update to at least one of the one or more data items updated in the first updatable transaction before a commit of the first updatable transaction 604. After receiving the update of the second transaction, the method 600 includes receiving a database query language statement to commit the second updatable transaction 606 and holding the commit of the second updatable transaction at least until termination of the first updatable transaction 608. The termination of the first updatable transaction may be a commit, rollback, or timeout. A time out typically operates as a rollback. If the termination is a commit, the second updatable transaction commits. If the termination is a rollback or timeout, the second updatable transaction may commit or rollback depending on the particular embodiment.

In some embodiments, one or both of the first and second database query language statements may include a READ-FOR-UPDATE of the data. The second database query language statement may select one or more uncommitted, updated data items of the first updatable transaction. Some such embodiments may further include receiving a third database query language statement to initiate a read-only transaction including a read of one or more data items updated but not committed in at least one of the first and second updatable transactions. In such embodiments, the read-only transaction of the third database query language statement reads only committed values from the database. In some other embodiments, when receiving the third database query language statement to initiate the read-only transaction including a read of one or more data items updated but not committed in at least one of the first and second updatable transactions, the read-only transaction may read uncommitted values from the database. Thus, depending on the particular embodiments, a read-only transaction may or may not read uncommitted, updated data values from the database. However, in some embodiments, a read-only transaction may wait for uncommitted, modified values to be committed on commit time.

FIG. 7 is a block flow diagram of a method 700 according to an example embodiment. The example method 700 includes maintaining a reader snapshot of data stored in a database and a writer snapshot of data stored in the database, the writer snapshot of data including uncommitted, modified values of transactions and the reader snapshot including unmodified committed data values 702. The method 700 further includes receiving a first query language statement to initiate a first transaction to update data 704 and retrieving the data from the writer snapshot to fulfill the first query language statement, the retrieved data of the writer snapshot of data including an uncommitted data value updated in another transaction 706. The method 700 may also include receiving a second query language statement to update the uncommitted data value updated in the another transaction 708, receiving a third query language statement to commit the update of the second query language statement 710, and holding the commit of the third query language statement until a commit is performed within the another transaction 712. The method 700 then includes updating the reader snapshot of data with most recently updated data values upon committing a transaction 714. A fourth query language statement to initiate a second transaction to read data may also be received. Such embodiments include retrieving data from the reader snapshot of data to fulfill the fourth query language statement. In some embodiments, the retrieved data may include only committed data values.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving a first database query language statement to initiate a first updatable transaction, the first updatable transaction including an update of one or more data items stored in a database;
   receiving a second database query language statement to initiate a second updatable transaction, the second updatable transaction including an update to at least one of the one or more data items updated in the first updatable transaction before a commit of the first updatable transaction;
   receiving a database query language statement to commit the second updatable transaction; and
   holding the commit of the second updatable transaction at least until termination of the first updatable transaction.

2. The method of claim 1, wherein termination of the first updatable transaction is a commit of the first updatable transaction.

3. The method of claim 1, wherein the first database query language statement includes a READ-FOR-UPDATE of the one or more data items stored in the database.

4. The method of claim 3, wherein the second database query language statement includes a READ-FOR-UPDATE of at least one of the one or more data items stored in the database.

5. The method of claim 4, wherein:
   the second database query language statement selects at least one data item updated within the first updatable transaction; and
   each selected data item of the at least one data item updated within the first updatable transaction, when retrieved within the second updatable transaction, is an uncommitted updated value of the first updatable transaction.

6. The method of claim 5, further comprising:
   receiving a third database query language statement to initiate a read-only transaction, the read-only transaction including a read of one or more data items updated but not committed in at least one of the first and second updatable transactions; and
   wherein the read-only transaction of the third database query language statement reads only committed values from the database.

7. The method of claim 1, further comprising:
   receiving a third database query language statement to initiate a read-only transaction, the read-only transaction including a read of one or more data items updated but not committed in at least one of the first and second updatable transactions.

8. The method of claim 7, wherein the read-only transaction of the third database query language statement reads only committed values from the database.

9. The method of claim 1, further comprising:
   receiving and executing database query language command to commit the first updatable transaction;
   executing the held commit of the second updatable transaction.

10. The method of claim 1, further comprising:
    receiving and executing a rollback database query language command to rollback uncommitted, updated data item values of the first updatable transaction to previously stored values of the uncommitted, updated data items; and
    rolling back uncommitted, updated data item values of the second updatable transaction to the previously stored values of the uncommitted, updated data items.

11. A non-transitory computer-readable medium with instructions thereon which when processed by a suitably configured computing device causes the computing device to:
    upon receipt of a query language statement to initiate a transaction within a database management system, determine if the transaction is to be initiated for update of data or for read-only access to data;
    if the query language statement specifies the transaction is for read-only access to data:
       initiate a read-only transaction within the database management system; and
       take a data snapshot of committed values of data items specified in the query language statement for use within the read-only transaction; and
    if the query language statement specifies the transaction is for update of data:
       initiate an updatable transaction within the database management system; and
       take a data snapshot of most recently updated values of data items specified in the query language statement, the most recently updated value of the data items including values of the data items most recently updated in other uncommitted updatable transactions; and
    receive updates to one or more data items of an updatable transaction data snapshot, the one or more updated data items including at least one uncommitted data item of one or more other updatable transaction;
    receive a query language commit command for the updatable transaction;
    holding the commit of the updatable transaction until the one or more other updatable transactions of the at least one uncommitted data item of the one or more other updatable transactions are closed.

12. The non-transitory computer-readable medium of claim 11, wherein the snapshot of most recently updated values of data items specified in the query language statement is accessible by subsequently initiated updatable transactions within the database management system.

13. The non-transitory computer-readable medium of claim 11, wherein the query language statements conform to a form of structured query language ("SQL").

14. The non-transitory computer-readable medium of claim 11, wherein the instructions are further operable to cause the suitably configured computing device to:
roll back the updatable transaction if one or more of the other updatable transactions are closed by a rollback; and
execute the commit command of the updatable transaction if the one or more other updatable transactions are each successfully committed.

15. A system comprising:
one or more data storage devices;
a database management system to manage data stored in at least one of the one or more data storage devices, the database management system operable to:
allow access to uncommitted updated data of other transactions by an updatable transaction;
create a dependency of a second transaction from a first transaction when the second transaction accesses uncommitted updated data of the first transaction; and
hold a commit of the second transaction until the first transaction, from which the second transaction depends, is committed.

16. The system of claim 15, wherein the database management system is further operable to:
assign a commit sequence number to each transaction initiated within the database management system for update; and
wherein the dependency of the second transaction from the first transaction is created by assigning the second transaction a greater commit sequence number.

17. The system of claim 16, wherein the commit sequence number is a timestamp.

18. The system of claim 15, wherein the dependency of the second transaction from the first transaction is created by including an identifier of the first transaction in a buffer of the second transaction.

19. The system of claim 15, wherein the database management system is further operable to:
allow access to uncommitted update data of other transactions by a read-only transaction.

20. The system of claim 15, wherein access to uncommitted updated data of other transactions consists of access to a most recently modified value of uncommitted updated data.

21. A method comprising:
maintaining a reader snapshot of data stored in a database and a writer snapshot of data stored in the database, the writer snapshot of data including uncommitted, modified values of transactions and the reader snapshot including unmodified committed data values;
receiving a first query language statement to initiate a first transaction to update data;
retrieving data from the writer snapshot of data to fulfill the first query language statement, the retrieved data of the writer snapshot of data including an uncommitted data value updated in another transaction;
receiving a second query language statement to update the uncommitted data value updated in the another transaction;
receiving a third query language statement to commit the update of the second query language statement;
holding the commit of the third query language statement until a commit is performed within the another transaction; and
updating the reader snapshot of data with most recently updated data values upon committing a transaction.

22. The method of claim 21, further comprising:
receiving a fourth query language statement to initiate a second transaction to read data;
retrieving data from the reader snapshot of data to fulfill the fourth query language statement, the retrieved data including only committed data values.

* * * * *